United States Patent [19]

Crawford et al.

[11] 4,334,656

[45] Jun. 15, 1982

[54] AUTOMATIC TAPE THREADING APPARATUS FOR MAGNETIC TAPE TRANSPORTS

[75] Inventors: Roy P. Crawford; Paul A. Gilovich, both of Saratoga, Calif.; David H. McMurtry, Tucson, Ariz.

[73] Assignee: International Business Machines Corporation, Armonk, N.Y.

[21] Appl. No.: 164,733

[22] Filed: Jun. 30, 1980

[51] Int. Cl.³ .................... G03B 1/04; G11B 15/32
[52] U.S. Cl. .................................. 242/195; 226/92
[58] Field of Search ............... 242/76, 195, 201, 206, 242/208, 210; 226/91, 92, 195, 11; 352/157, 158

[56] References Cited

U.S. PATENT DOCUMENTS 3,119,574  1/1964  Laa ........................................ 242/195
3,934,840  1/1976  Inaga ..................................... 242/195

Primary Examiner—Leonard D. Christian
Attorney, Agent, or Firm—R. E. Cummins

[57] ABSTRACT

A method and apparatus for automatically threading web material, e.g., magnetic tape, from a replaceable supply reel to a non-replaceable take-up reel of a web transport device, in which the web path is nonlinear and relatively complex as a result of various components, e.g., magnetic transducer tape guides, which act on the web while it is being transported.

The apparatus comprises a coupling device and a mechanism for moving and guiding the coupling device between the supply reel and the take-up reel. The coupling device couples to a leader block attached to the tape at the supply reel. The mechanism moves and guides the coupling device to thread the tape over the predefined tape path and positions the leader block wholly within a radially disposed slot in the hub of the take-up reel. The coupling device remains attached to the moving mechanism and coupled to the leader block when the leader block is rotated with the take-up reel.

The method is characterized by the steps of maintaining the relationship of the coupling device to the leader block and to the moving and guiding means during rotation of the take-up reel when the leader block is positioned in the radially disposed slot of the take-up reel.

8 Claims, 4 Drawing Figures

AUTOMATIC TAPE THREADING APPARATUS FOR MAGNETIC TAPE TRANSPORTS

DESCRIPTION

This invention relates in general to automatic tape threading methods and apparatus for magnetic tape transports and, in particular to an automatic tape threading method and apparatus for threading the leading edge of magnetic tape from a supply reel through a nonlinear tape path past a magnetic transducer to a take-up reel of the tape transport.

BACKGROUND OF THE INVENTION

Various arrangements are suggested in the prior art for automatically threading flexible web material from a supply reel to a take-up reel. The functions which the various threading mechanisms must perform are dependent, to a great extent, on the particular web transport mechanism with which the particular automatic threading mechanism must cooperate. Automatic threading mechanisms have been shown to be quite useful in connection with magnetic tape transport devices which move the tape media past a stationary magnetic transducer for the reading of previously stored information or for the storage of new information. For a number of well-known reasons, it is desirable to keep the segment of the tape that is being read or written on by the magnetic transducer as close as possible to the flux gap of the transducer and, also, to move the tape relative to the transducer at a substantially constant speed during reading and writing. Constraints such as these, plus others, result in the tape path between the supply reel and the take-up reel of a magnetic tape transport being somewhat complex and not linear. As tape paths have become more complex and magnetic tape thinner, and hence, more flexible, the prior art automatic threading arrangements, such as the pneumatic guiding of the end of the tape or providing a leader on the take-up reel which is automatically coupled to the end of the tape on the supply reel, have all suffered from one or more disadvantages.

SUMMARY OF THE INVENTION

The present invention envisions an automatic tape threading apparatus for use with a reel-to-reel magnetic tape transport having a nonlinear tape path which involves basically two functions. The first function involves a device which is adapted to be selectively coupled to the leading end of the tape which is wrapped on the supply reel. In the embodiment disclosed in this application, the device is merely a pin which is disposed with its axis parallel to the axis of rotation of the supply and take-up reels and positioned to be engaged by the leader block attached to the leading end of the tape as a result of relative movement in two orthogonal directions between the leader block and the pin.

The second function of the automatic threading apparatus of the present invention involves a mechanism which will move the coupling device and leader block over a predetermined nonlinear path from its first position where the coupling occurs to a second position where the pin of the coupling device is positioned substantially coaxially with the rotational axis of the take-up reel with the leader block disposed in a matching opening provided in the take-up reel so that the tape may be wound on the take-up reel without the coupling device, i.e., the pin, being uncoupled from the leader block.

The unthreading operation involves the mechanism either moving the coupling device in the opposite direction over the tape path while the slack is taken up by the supply reel, or merely guiding the leader block over the path as the tape is pulled back by action of the supply reel being driven in the reverse direction. When the leader block is returned to its home position, the device is uncoupled by relative movement between the pin and the block opposite to that employed in the coupling operation.

It is, therefore, an object of the present invention to provide an apparatus for automatically threading web material from a supply reel over a nonlinear path to a take-up reel.

Another object of the present invention is to provide an improved automatic tape threading apparatus for use with a magnetic tape transport in which the tape path from the supply reel to the take-up reel is nonlinear and includes a magnetic transducer.

A further object of the present invention is to provide an automatic threading apparatus for a magnetic tape transport which couples to a leader block associated with the tape on the supply reel, moves this leader block to a matching recess on the take-up reel, and is maintained in coupling relation to the leader block as tape is wound on the take-up reel.

A still further object of the present invention is to provide an automatic tape threading method which is characterized by the step of maintaining a portion of the tape threading mechanism coupled to the tape as the tape is wound on the take-up reel.

The foregoing and other objects, features and advantages of the invention will be apparent from the following more particular description of a preferred embodiment of the invention as illustrated in the accompanying drawings.

DESCRIPTION OF THE INVENTION

Figure 1:
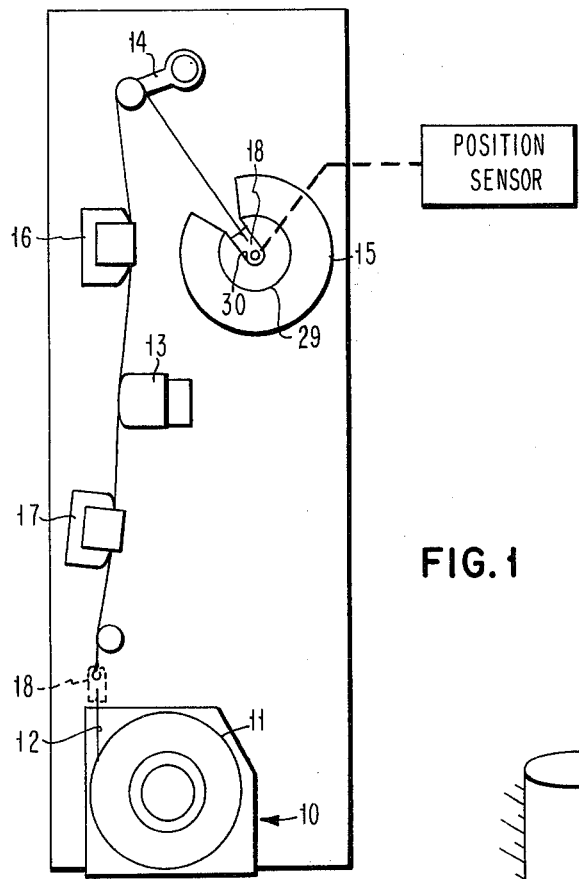
FIG. 1 is a plan view which illustrates a reel-to-reel type magnetic tape transport with which the present invention may be advantageously employed.

FIG. 1 shows in plan view a typical magnetic tape transport which includes a cartridge 10 for holding a supply reel 11 of conventional magnetic tape 12 which is threaded past a magnetic transducer 13 around a tension transducer 14 to the take-up reel 15. A pair of tape guides 16 and 17 are also illustrated whose function is to maintain tape 12 in flux transducing relationship with the flux gap of the magnetic transducer 13. The drive motors and the controls therefor are not illustrated in that any conventional prior art reel drive system may be employed. The details of the tension transducer 14 are also not illustrated since the overall function and operation of such devices are well-known in the art and since the details form no part of the present invention.

Figure 4:
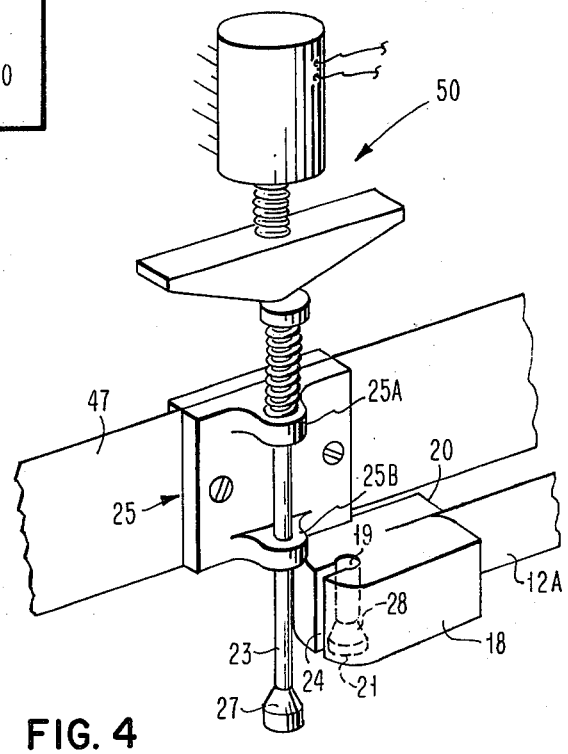
FIG. 4 is an enlarged detail view illustrating the coupling device and its function relative to the leader block.

As shown in FIG. 1, the leading end of the tape 12 to be wound from the supply reel is provided with a leader block 18 which is shown in more detail in FIG. 4.

The construction of the leader block is such that it (1) can be selectively engaged by a coupling device of the automatic threading apparatus, and (2) can be positioned relative to the take-up reel so that tape can be wound on the take-up reel without disengaging the coupling device from the leader block.

With reference to FIG. 4, the leader block 18 shown therein is generally rectangular in shape and is provided with a pin receiving opening 19 at its leading edge. The trailing edge 20 of the leader block is provided with suitable means for attaching the leading end 12A of the tape. The pin receiving opening 19 has its axis parallel to the plane of the tape and, in practice, block 18 may be releasably held by the cartridge 10 with the axis of the pin receiving opening parallel to the axis of rotation of reel 11. The opening 19 extends through the block, 18, with the lower portion 21 of the opening being somewhat larger to accommodate the coupling pin 23 of the coupling device 25. A slot 24 extends from the front edge of the leader block to the opening 19 such that, in plan view, the bottom portion 21 of the block 18 resembles the shape of a keyhole. The size of the slot 24 is sufficient to permit the pin 23 on the coupling device 25 to slide through in an unrestricted manner into the opening 19 when relative movement occurs in a direction normal to the pin axis. Subsequent relative movement in a direction parallel to the axis of the pin 23 permits the cone-shaped end 27 of the pin to engage the cone-shaped recess 28 at the bottom 21 of the leader block 18. The pin 23 of coupling device 25 is attached for sliding movement relative to a band member 47 (to be discussed later) by means of bearing elements 25A and 25B fixedly attached to the band.

As shown in FIG. 1, the hub 29 of the take-up reel 15 is provided with a leader block receiving slot 30 which has a shape matching that of the leader block 18. The slot extends from the outer periphery of the hub 29 radially inward past the axis of rotation a sufficient distance to position the axis of the pin 23 of the coupling device coaxially with the axis of rotation of the take-up reel 15. With the pin 23 so positioned, the leader block 18 is free to rotate relative to the pin 23 as tape is wound on the take-up reel 15 so there is no necessity to disengage the coupling device of the threading apparatus from the leader block 18 during the winding operation. Alternately, the pin 23 could be designed to rotate with the leader block 18 and the reel 15 relative to the remaining portion of the coupling device which is held stationary by the threading apparatus.

Copending application, Ser. No. 161,808, filed concurrently herewith and assigned to the assignee of the present invention describes and claims a magnetic tape reel which is suitable for use in the present invention.

The mechanism 40 for moving the pin 23 from a first position where it is selectively coupled and uncoupled from the leader block 18 to a second position in the substantial center of the take-up reel 15 will now be described in connection with FIGS. 2 and 3. The mechanism, as shown, comprises pulley 41 which is coupled to a shaft 42 of motor 43. Motor 43 is mounted to position the shaft 42 parallel to the axis of rotation of the supply and take-up reels 11 and 15. The diameter of pulley 41 is related to the shape of a predetermined section of the tape path.

The mechanism further includes an idler pulley 45 which is journalled for rotation about an axis which is also parallel to the axis of rotation of the supply and take-up reels 11 and 15. The diameter of the pulley 45 and the position of its shaft 46 is chosen so that the pin 23 of the coupling device is positioned in a coupling relationship with the leader block 18 when the coupling device is attached to the continuous band member 47 which encircles the pulleys 41 and 45. As shown in FIG. 3, the pulleys 41 and 45 are positioned above the plane of the tape reels such that a point on the band 47 traces the tape path from the supply reel 11 to the take-up reel 15.

The coupling device 25, including pin 23, is permanently attached to the exterior surface of the band member, as shown in FIG. 4, and positions the pin 23 with its axis parallel to the pulley axis. The pin 23, as shown, is mounted for sliding movement axially between two positions. The first position is where the cone-shaped end 27 of the pin 23 is below the bottom surface of the leader block 18 shown in dotted line position in FIG. 3. The second position is where the cone-shaped portion 27 of the pin 23 is seated in the matching cone-shaped recess 28 provided in the leader block 18. The coupling of the pin 23 to the leader block 18 is accomplished by the relative motion of the two parts in first the direction normal to the pin axis and second vertically, as shown in FIG. 4. It will be recognized that the equivalent function can be achieved by the movement of the leader block 18 (or cartridge 10 and leader block 18) in orthogonal directions while the pin 23 is stationary with corresponding results. Various arrangements known in the art may be employed to achieve the function of obtaining the axial movement of the pin relative to the leader block. As shown in FIG. 4, the arrangement 50 involves a spring member biasing the pin upward and a solenoid operated lever which overcomes the normal biasing of the spring when the leader block is to be decoupled from the coupling device.

Figure 2:
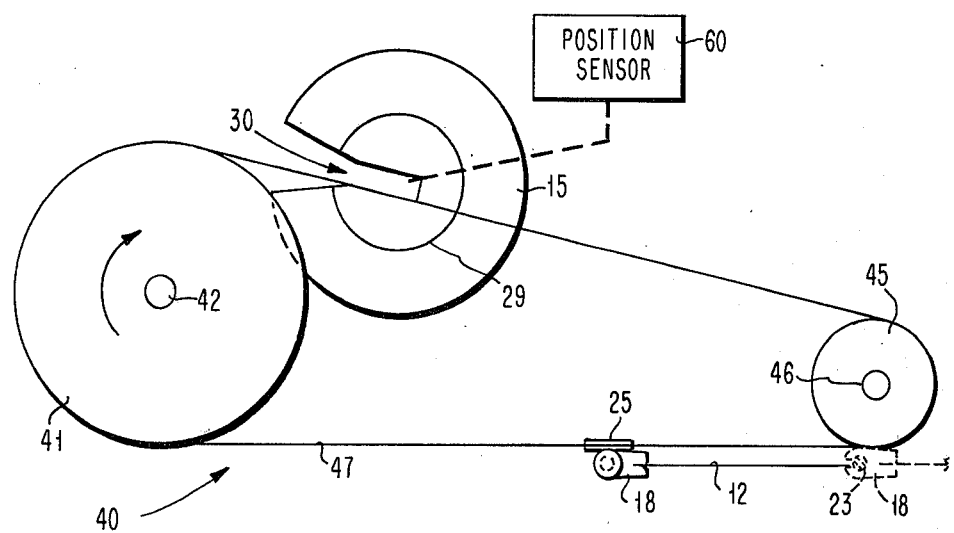
FIG. 2 is a plan view of an automatic tape threading apparatus embodying the present invention for use with the tape transport shown in FIG. 1.

As mentioned previously, the band member 47 generally overlies the tape path so that when the driven pulley 41 is rotated in a clockwise direction, as seen in FIG. 2, the leader block 18 and the magnetic tape 12 attached thereto are pulled from the cartridge 10 and follow the path traversed by the coupling device 25 which is shown schematically in FIG. 2. As a result, the tape 12 is threaded through the tape guides 16 and 17 and past the transducer 13 around the tension transducer 14 to the take-up reel 15. The leader block 18 is positioned in the leader block receiving slot 30 of the take-up reel 15 since the tape reel 15 has been rotated to a point which will receive the leader block. The position of the take-up reel may be established by any suitable sensing device 60, as shown diagrammatically in FIG. 2. The coupling pin 23 is now disposed substantially coaxial with the axis of rotation of the take-up reel 15 so that rotation of the take-up reel 15, and hence, the leader block 18 can occur without any adverse affect on the coupling pin 23 or its mounting arrangement on the band 47.

The leader block 18 is returned over the tape path by either reversing the pulley motor 43 and simultaneously energizing the supply reel drive motor in the reverse direction to take up the slack tape 12 as the leader block 18 retreats, or by the supply reel motor being employed to pull the tape 12 back with the band 47 of the threading mechanism functioning solely as a guide for the leader block 18. The band member 47 is flexible enough to permit some transverse movement of the leader block 18 and coupling device 25 relative to the actual tape path where it encounters a section of the tape path which involves only shallow curves, such as might occur at the guides 16 and 17 adjacent the magnetic transducer 13.

In tape transports which involve a tape path having a segment involving a more substantial "wrap" of the tape around the transducers, additional idler pulleys may also be employed to cause the band 47 to track the actual tape path.

Figure 3:
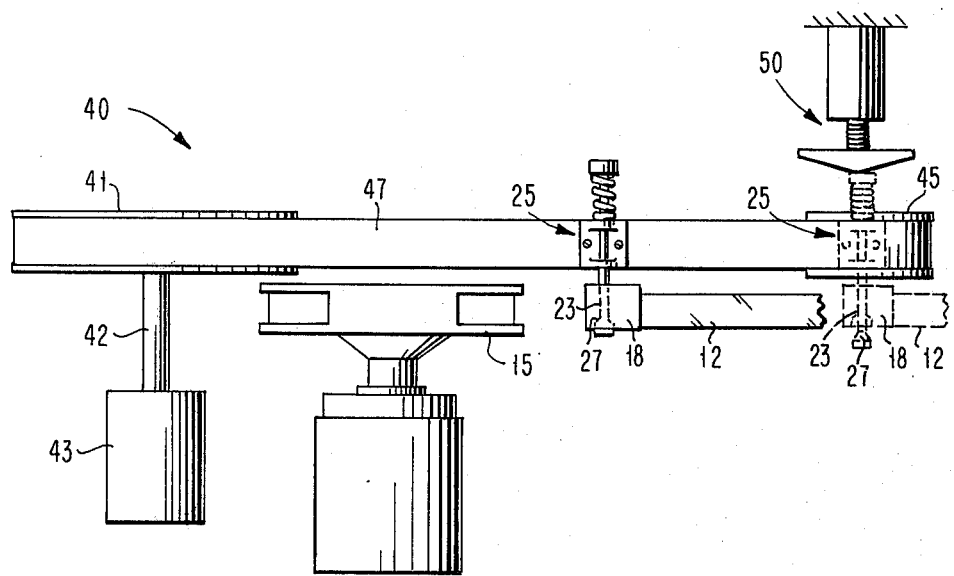
FIG. 3 is a view in elevation of the apparatus shown in FIG. 2.

The particular mechanism illustrated in FIGS. 2 and 3 for moving the coupling pin 23 once it has engaged the leader block 18 over the tape path to the general vicinity of the center of the take-up reel 15 is merely one example of a mechanism which can be designed to trace a prescribed circuitous tape path. It should be obvious to those skilled in the art that various other arrangements may be employed. One such prior art arrangement is a system of bar linkages arranged where the coupling pin is disposed at the end of the bar and the bar can be moved in either of two directions in a plane parallel to the tape reels 11 and 15 and rotated selectively in either direction about an axis normal to the plane of the tape reels 11 and 15, and concurrently with the horizontal movement in two directions.

It should also be apparent to those skilled in the art that while the disclosed embodiment describes a reel-to-reel type tape transport, the invention can be applied to other types of magnetic tape transports and would also be applicable to any type of web transport apparatus where a web wound on a supply reel is transported through one or more processing stations disposed along a complex web path to a take-up reel and then rewound onto the supply reel by the same transport mechanism.

It should also be apparent that for very wide webs, a second transport mechanism moving identically to the first transport mechanism could lie on the opposite side of the baseplate. The leader block would now look like a leader bar supported on both ends by the transport mechanism and operating through slots in the baseplate.

While the invention has been particularly shown and described with reference to the preferred embodiment thereof, it will be understood by those skilled in the art that various changes in the form and details may be made therein without departing from the spirit and scope of the invention.

Having thus described our invention, what we claim as new, and desire to secure by Letters Patent, is:

1. In combination with a web transport which transfers elongated flexible web material wound on a supply reel to a web take-up reel having a hub for receiving said material over a predefined nonlinear web path which includes a web processing station,
   an automatic threading apparatus for moving a leader block attached to the leading end of the web material wrapped on said supply reel over said web path from a first predefined position to a second position which couples said leader block to said take-up reel for subsequent conjoint rotational movement with said take-up reel about the axis of rotation of said take-up reel during winding and unwinding of web material on and off said take-up reel, said apparatus comprising:
   a device adapted to selectively couple said leader block to said device at said first predetermined position which permits rotation of said block relative to said device about a first axis parallel to the axis of said reels;
   a mechanism for moving said device and said coupled leader block from said first predetermined position to said second position to dispose said first axis coaxially with the axis of said take-up reel and said web material in winding relationship to the hub of said take-up reel, and for guiding said coupling device during movement over a predetermined path which corresponds to said tape path; and
   means for permanently attaching said coupling device to said mechanism.

2. The combination recited in claim 1 in which said web is relatively flexible magnetic tape and said processing station comprises a magnetic transducer.

3. The combination recited in claim 2 in which said coupling device comprises a pin element and means for holding said pin element for attachment to said mechanism by said attaching means.

4. The combination recited in claim 3 in which said mechanism includes a plurality of pulleys, one of which is a driven pulley, and a band disposed around said pulleys to which said coupling device is attached.

5. The combination recited in claim 4 in which the diameter of said pulleys and the placement of their respective axes of rotation relative to said reels and said magnetic transducer cause the band member to move said coupled device over a prescribed path corresponding to said tape path.

6. The combination recited in claim 5 further including means disposed at said first predefined position for causing relative movement between said pin and said leader block which results in a coupling relationship therebetween.

7. The combination recited in claim 6 in which said relative movement involves movement in two orthogonal directions, one of which is parallel to the axis of said pin.

8. A method of automatically threading magnetic tape from a supply reel disposed on a magnetic tape transport through a nonlinear complex tape path having at least one magnetic transducer to a non-removable take-up reel so as to position a segment of said tape from said supply reel in said tape path and in a winding relationship to the hub of said take-up reel comprising the steps of:
   positioning a coupling member permanently associated with an automatic threading device in coupling relationship to a leader block member associated with said supply reel;
   moving at least one of said members to couple said two members together;
   moving said coupling member by said device over a predefined path corresponding to said nonlinear complex path to position said leader block member in an opening in said take-up reel disposed within the circumferential boundaries of the hub portion of said take-up reel; and
   maintaining said leader block within said opening as said take-up reel is rotated to cause said tape from said supply reel to be transported over said path and wound on the hub of said take-up reel and maintaining the coupling relationship between said coupling member and said leader block as said leader block is rotated by said take-up reel.

* * * * *